US009641739B2

(12) United States Patent
Hamano

(10) Patent No.: US 9,641,739 B2
(45) Date of Patent: May 2, 2017

(54) IMAGING APPARATUS AND IMAGING METHOD WITH IMPROVED FOCUS ADJUSTMENT

(71) Applicant: CANON KABUSHIKI KAISHA, Tokyo (JP)

(72) Inventor: Hideyuki Hamano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 14/252,550

(22) Filed: Apr. 14, 2014

(65) Prior Publication Data
US 2014/0313398 A1    Oct. 23, 2014

(30) Foreign Application Priority Data

Apr. 17, 2013  (JP) .................................. 2013-086625

(51) Int. Cl.
*H04N 5/232*     (2006.01)
(52) U.S. Cl.
CPC .............................. *H04N 5/23212* (2013.01)
(58) Field of Classification Search
None
See application file for complete search history.

(56) References Cited

U.S. PATENT DOCUMENTS

| | | | | |
|---|---|---|---|---|
| 5,003,339 | A * | 3/1991 | Kikuchi et al. ............... | 396/100 |
| 6,700,618 | B1 * | 3/2004 | Chubachi ..................... | 348/354 |
| 2004/0227843 | A1 * | 11/2004 | Watanabe .......... | H04N 5/23212 348/354 |
| 2004/0233320 | A1 * | 11/2004 | Watanabe .......... | H04N 5/23212 348/354 |
| 2008/0273869 | A1 * | 11/2008 | Lukyanov .......... | H04N 5/23212 396/125 |
| 2009/0201410 | A1 * | 8/2009 | Nishiguchi et al. .......... | 348/345 |
| 2010/0026879 | A1 * | 2/2010 | Koh et al. ..................... | 348/352 |
| 2010/0123818 | A1 * | 5/2010 | Ono .............................. | 348/345 |
| 2011/0205403 | A1 * | 8/2011 | Ito ................................. | 348/241 |

(Continued)

FOREIGN PATENT DOCUMENTS

| | | |
|---|---|---|
| JP | 7-298120 A | 11/1995 |
| JP | 2006-189634 A | 7/2006 |

(Continued)

*Primary Examiner* — Justin P Misleh
(74) *Attorney, Agent, or Firm* — Canon USA, Inc. IP Division

(57) ABSTRACT

An imaging apparatus including an image sensor, an evaluation value calculation unit, and an in-focus position calculation unit. The image sensor performs photoelectric conversion on a subject image formed by an image optical system including a focus adjustment unit. The evaluation value calculation unit calculates a first and a second focus evaluation values with spatial frequency components of first and second frequency bands extracted from image signals output from the image sensor. The second frequency band includes a spatial frequency component higher than the spatial frequency component of the first frequency band. The in-focus position calculation unit defines a position at which a third focus evaluation value reaches its peak value as an in-focus position of the focus adjustment unit. The third focus evaluation value is obtained by calculating a ratio of the first and the second focus evaluation values.

14 Claims, 12 Drawing Sheets

(56) References Cited

U.S. PATENT DOCUMENTS

| | | | |
|---|---|---|---|
| 2012/0162494 A1* | 6/2012 | Nakamura | 348/345 |
| 2013/0016245 A1* | 1/2013 | Yuba | 348/222.1 |
| 2013/0201386 A1* | 8/2013 | Ohbuchi | H04N 5/23212 |
| | | | 348/349 |
| 2014/0198246 A1* | 7/2014 | Ono | 348/353 |
| 2014/0300802 A1* | 10/2014 | Hamano | 348/354 |

FOREIGN PATENT DOCUMENTS

| | | |
|---|---|---|
| JP | 2010-078810 A | 4/2010 |
| JP | 2010-079201 A | 4/2010 |
| JP | 2010-122301 A | 6/2010 |
| JP | 2012-137530 A | 7/2012 |

* cited by examiner

FIG. 5A  NORMAL SUBJECT
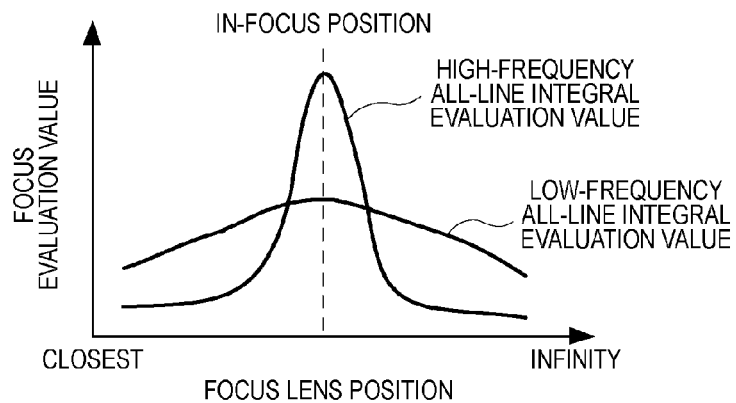
FIG. 5B  POINT LIGHT SOURCE SUBJECT (EXAMPLE 1)
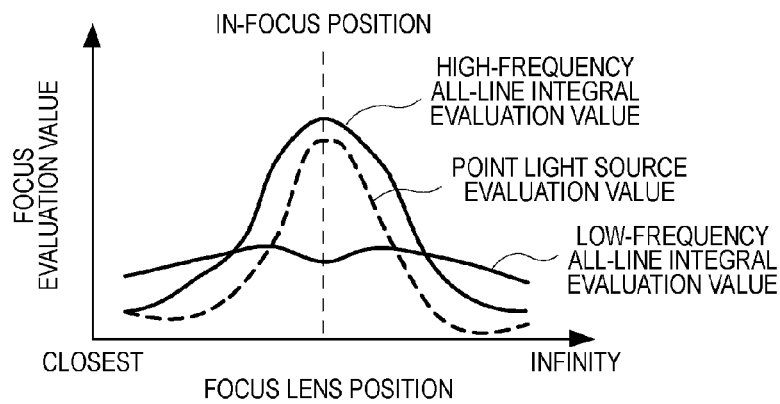
FIG. 5C  POINT LIGHT SOURCE SUBJECT (EXAMPLE 2)
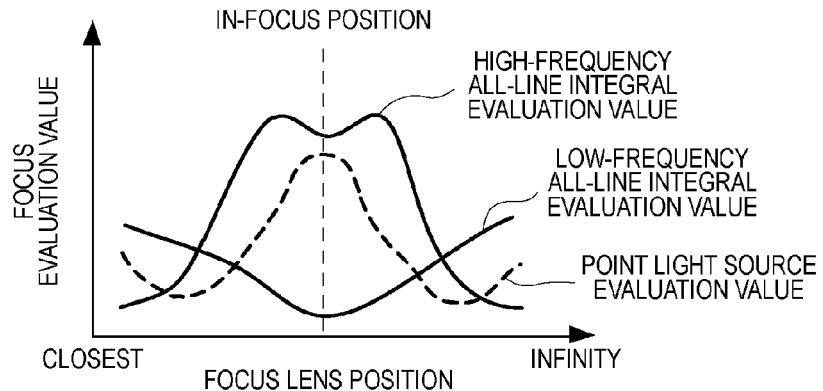

IMAGING APPARATUS AND IMAGING METHOD WITH IMPROVED FOCUS ADJUSTMENT

BACKGROUND

Technical Field

The present disclosure relates to an imaging apparatus that is mountable on a digital still camera, a digital video camera, and a mobile phone and performs focus adjustment using an image signal acquired by an image sensor that performs photoelectric conversion on a subject image formed by an image optical system.

Description of the Related Art

In digital cameras and video cameras, an autofocus (hereinafter referred to as AF) scheme that achieves focus by using output signals from an image sensor, such as a CCD and a CMOS, and detecting a signal corresponding to contrast of a subject, or so-called contrast detection AF, is common.

Some proposed conventional types of evaluation value for the contrast detection AF include a line-peak integral evaluation value obtained by integrating in a vertical direction a peak value of the evaluation value of each horizontal line. This type of evaluation value is stable due to the effect of the integration and is unsusceptible to noise. Hence, this is suitable for in-focus position detection and direction determination in a case where signals sensitively change in response to a slight focus shift (Japanese Patent Application Laid-Open No. 07-298120 A).

Furthermore, a possible solution that has been proposed to a problem with the contrast detection AF in that focus may not be achieved for a high luminance subject is to detect a relative minimum of a line-peak integral evaluation value to perform focus adjustment (Japanese Patent Application Laid-Open No. 2006-189634 A). With the line-peak integral evaluation value described above, a lens position at which the value is increased is not necessarily an in-focus point in some cases. FIG. 9 is a diagram of relationship between a line-peak integral evaluation value and a focus lens position for a normal subject.

FIG. 10 is a diagram of relationship between a line-peak integral evaluation value and a focus lens position for a point light source subject, such as a night scene. For the normal subject, the focus lens position at which the line-peak integral evaluation value reaches its maximum is an in-focus point. For the point light source subject, such as a night scene, the focus lens position at which the line-peak integral evaluation value reaches its maximum is not an in-focus point. This is because the point light source in an image changes in size with a degree of focusing. This will now be described in detail with reference to FIGS. 11A and 11B.

FIGS. 11A and 11B are diagrams of example images in focus and not in focus of a point light source subject, such as a night scene. As illustrated in FIG. 11A, a peak value of each line is large but the number of lines on which the subject image lies is small in the in-focus image. As illustrated in FIG. 11B, the point light source in the image is blurred to grow in size in the not-in-focus image.

Thus, the peak value of each line is small, but the number of lines on which the subject image lies is larger, resulting in an increased line-peak integral evaluation value.

As described above, in the focus adjustment performed in such a manner that the line-peak integral evaluation value is increased, focus may not be achieved for a point light source subject.

A possible solution that has been proposed to such a problem is, as described above, to detect a relative minimum of the line-peak integral evaluation value to perform the focus adjustment.

There has been a problem, however, with a screen in which a high luminance portion is present in that a focus lens position at which the line-peak integral evaluation value reaches its relative minimum is not necessarily an in-focus position. FIG. 12 is a diagram for describing a case where a focus lens position at which a line peak reaches its relative minimum is not an in-focus position. A horizontal axis represents a focus lens position, and a vertical axis represents a line-peak integral evaluation value.

In FIG. 12, the line-peak integral evaluation value lacks change in proximity to the in-focus position. This is because the form of the line-peak integral evaluation value in proximity to the in-focus position varies with conditions of the point light source, such as its size and the number thereof, within a range (an AF evaluation range) for which the line-peak integral evaluation value is calculated, and a spatial frequency band extracted for the calculation of the line-peak integral evaluation value. In general, the higher the frequency band is for the calculation of the evaluation value, the likelier it becomes that the line-peak integral evaluation value is formed to have a projection in proximity to the in-focus position, whereas the lower the frequency band, the likelier it becomes that the line-peak integral evaluation value is formed to have a depression in proximity to the in-focus position.

Thus, the line-peak integral evaluation value of a medium frequency band may lack change as illustrated in FIG. 12. If the amount of change in line-peak integral evaluation value in proximity to the in-focus position is small as illustrated FIG. 12, a relative maximum and a relative minimum of the line-peak integral evaluation value may not be detected, resulting in degradation in accuracy of in-focus position detection.

SUMMARY

An aspect of the invention is to detect an in-focus position accurately even in a case, such as of a point light source, where an evaluation value form for use in the contrast AF has a small change in proximity to an in-focus position.

An imaging apparatus according to an aspect of the present invention, which includes an image sensor configured to perform photoelectric conversion on a subject image formed by an image optical system including a focus adjustment unit that is configured to adjust a focus state of the subject image and a control unit configured to allow the focus adjustment unit to be driven in accordance with an image signal output from the image sensor, includes: an evaluation value calculation unit configured to calculate a first focus evaluation value and a second focus evaluation value, the first focus evaluation value being calculated with a spatial frequency component of a first frequency band extracted from an image signal output from a first imaging area of the image sensor, the first imaging area corresponding to a first focus detection area, the second focus evaluation value being calculated with a spatial frequency component of a second frequency band extracted from an image signal output from a second imaging area of the image sensor, the second imaging area corresponding to a second focus detection area, the second focus detection area overlapping with the first focus detection area, the second frequency band including a spatial frequency component higher than the spatial frequency component of the first frequency band; and an in-focus position calculation unit configured to define a position at which a third focus evaluation value reaches a peak value as an in-focus position of the focus adjustment unit, the third focus evaluation value being obtained by calculating a difference between the first focus evaluation value and the second focus evaluation value.

The imaging apparatus according to another aspect of the present invention includes: an image sensor configured to perform photoelectric conversion on a subject image formed by an image optical system including a focus adjustment unit;

an evaluation value calculation unit configured to calculate a first focus evaluation value and a second focus evaluation value, the first focus evaluation value being calculated with a spatial frequency component of a first high frequency band extracted from an image signal output from the image sensor, the second focus evaluation value being calculated with a spatial frequency component of a second high frequency band extracted from an image signal output from the image sensor, the second high frequency band including a spatial frequency component higher than the spatial frequency component of the first high frequency band; and an in-focus position calculation unit configured to define a position at which a third focus evaluation value reaches a peak value as an in-focus position of the focus adjustment unit, the third focus evaluation value being obtained by calculating a ratio of the first focus evaluation value and the second focus evaluation value.

Further features of the present invention will become apparent from the following description of exemplary embodiments (with reference to the attached drawings).

BRIEF DESCRIPTION OF THE DRAWINGS

FIG. 5A is a graph of example focus evaluation values with the AF evaluation ranges including no point light source according to the embodiment of the invention; FIG. 5B is a graph of example focus evaluation values with the AF evaluation ranges including a point light source according to the embodiment of the invention; FIG. 5C is a graph of example focus evaluation values with the AF evaluation ranges including a point light source according to the embodiment of the present invention;

DESCRIPTION OF THE EMBODIMENTS

First Embodiment

Figure 1:
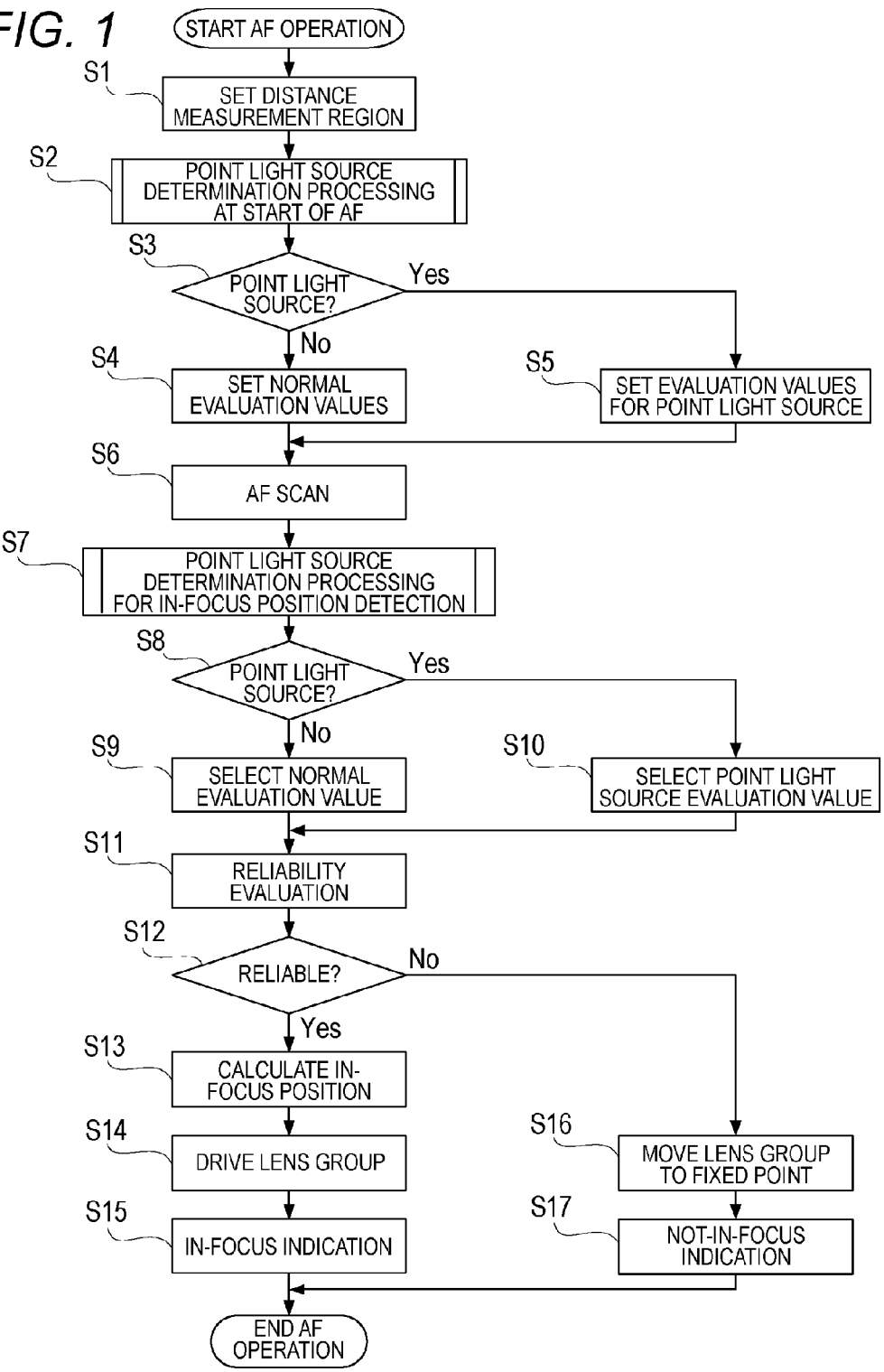
FIG. 1 is a flowchart of an AF operation procedure according to an embodiment of the present invention.

A preferred embodiment of the present invention will now be described in detail with reference to FIGS. 1 to 8. FIG. 2 is a block diagram of an exemplary schematic configuration of an imaging apparatus including a focus adjustment module according to this embodiment of the present invention. Examples of the imaging apparatus include, but are not limited to, a digital still camera and a digital video camera. The invention is applicable to an imaging apparatus that acquires an incoming optical image as an electric image through photoelectric conversion using a two-dimensional array image sensor, such as an area sensor.

(Description of Block Diagram)

In FIG. 2, reference numeral 1 refers to an imaging apparatus. Reference numeral 2 refers to a zoom lens group, and reference numeral 3 refers to a focus lens group making up a focus adjustment unit. The zoom lens group 2 and the focus lens group 3 make up an image optical system. Reference numeral 4 refers to an aperture, which is an exposure means and a light amount adjustment means for controlling the amount of light flux that has passed the image optical system. Reference numeral 31 refers to a lens barrel including the zoom lens group 2, the focus lens group 3, and the aperture 4.

Reference numeral 5 refers to an image sensor such as a CCD (hereinafter referred to as CCD) that performs photoelectric conversion on a subject image formed after passage through the image optical system. The image sensor, which performs the photoelectric conversion on the subject image formed by the image optical system 5 having the focus adjustment unit for adjusting the focus state of the subject image, may be a CMOS. Reference numeral 6 refers to an imaging circuit that receives an electric signal obtained through the photoelectric conversion by the CCD 5 and performs various types of image processing on the signal to generate a predetermined image signal. Reference numeral 7 refers to an A/D conversion circuit that changes the analog image signal generated by the imaging circuit 6 to a digital image signal.

Reference numeral 8 refers to a memory (VRAM), such as a buffer memory, that stores temporarily the digital image signal output from the A/D conversion circuit 7. Reference numeral 9 refers to a D/A conversion circuit that reads the image signal stored in the VRAM 8 for conversion to an analog signal that is an image signal in a form suitable for playback output.

Reference numeral 10 is an image display (hereinafter referred to as LCD), such as a liquid crystal display (LCD), that displays the image signal. Reference numeral 12 refers to a storing memory that includes a semiconductor memory and stores image data. Reference numeral 11 refers to a compression expansion circuit that includes a compression circuit and an expansion circuit. The compression circuit performs compression processing, encoding processing, and the like on the image data, and the expansion circuit performs decoding processing, expansion processing, and the like. The compression expansion circuit 11 reads the image signal stored temporarily in the VRAM 8 to cause it to be in an optimal form suitable for storage in the storing memory 12. The optimal form refers to a form optimal for playback display of the image data stored in the storing memory.

Reference numeral 13 refers to an AE processing circuit that performs automatic exposure (AE) processing in response to an output from the A/D conversion circuit 7. Reference numeral 14 refers to a scan AF operation circuit that performs autofocus (AF) processing in response to the output from the A/D conversion circuit 7. The scan AF operation circuit 14 has a function of a focus evaluation value arithmetic processing unit that extracts specific frequency components from image signals output from imaging areas of the image sensor and calculates focus evaluation values. The imaging areas correspond to focus detection areas. In the present embodiment, terms "focus detection area" and "AF evaluation range" are synonymous with each other.

The scan AF operation circuit 14 includes an evaluation value calculation unit that calculates a first focus evaluation value and a second focus evaluation value.

The first focus evaluation value is calculated with a spatial frequency component of a first frequency band extracted from an image signal output from a first imaging area of the image sensor. The first imaging area corresponds to a first focus detection area.

The second focus evaluation value is calculated with a spatial frequency component of a second frequency band extracted from an image signal output from a second imaging area of the image sensor. The second imaging area corresponds to a second focus detection area overlapping with the first focus detection area.

The scan AF operation circuit 14 also includes an in-focus position calculation unit that calculates a difference between the first focus evaluation value and the second focus evaluation value to obtain a third focus evaluation value and defines a position at which the third focus evaluation value reaches its peak value as an in-focus position of the focus adjustment unit.

The scan AF operation circuit 14 also calculates evaluation values for use in determination of a point light source and in calculation of an in-focus position for the point light source.

These evaluation values will be described hereinafter. Reference numeral 15 refers to a CPU with an integrated computational memory to perform control on the imaging apparatus. Reference numeral 16 refers to a timing generator (hereinafter referred to as TG) that generates a predetermined timing signal.

The CPU 15 uses the various evaluation values calculated by the scan AF operation circuit 14 to compute an in-focus position and perform the point light source determination. Reference numeral 17 refers to a CCD driver. Reference numeral 21 refers to an aperture drive motor that drives the aperture 4. Reference numeral 18 refers to a first motor drive circuit that controls the drive of the aperture drive motor 21. Reference numeral 22 refers to a focus drive motor that drives the focus lens group 3. The focus lens group 3 and the focus drive motor 22 correspond to the focus adjustment unit. Reference numeral 19 refers to a second motor drive circuit that controls the drive of the focus drive motor 22. Reference numeral 23 refers to a zoom drive motor that drives the zoom lens group 2. Reference numeral 20 refers to a third motor drive circuit that controls the drive of the zoom drive motor 23.

The CPU 15 uses the focus evaluation values calculated by the scan AF operation circuit 14 to control the focus drive motor 22 through the second motor drive circuit 19. Reference numeral 24 refers to control switches including various switches. Reference numeral 25 refers to an EEPROM, which is an electrically programmable read-only memory, that includes a program to execute various controls and the like and data to be used for performing various operations stored therein. Reference numeral 26 refers to a battery, reference numeral 28 to a flash unit, reference numeral 27 to a switching circuit that controls the emission of flash by the flash unit 28, and reference numeral 29 to a display device, such as an LED, to indicate the success or failure of an AF operation.

The storing memory, which is a storage medium for the image data and the like, is a fixed semiconductor memory, such as a flash memory, in a card or stick form. Other diverse forms including a semiconductor memory removably mounted on the apparatus, such as a card type flash memory, and a magnetic storage medium, such as a hard disk and a flexible disk, are also applicable.

The control switches 24 include a main power switch, a release switch, a playback switch, a zoom switch, and a switch to turn ON/OFF the displaying of a focus evaluation value signal on a monitor. The main power switch is for activating the imaging apparatus 1 and supplying power.

The release switch starts an image capture operation (a storing operation) and the like. The playback switch starts a playback operation. The zoom switch moves the zoom lens group 2 of the image optical system to perform zoom.

The release switch is configured with a two-step switch including a first stroke (hereinafter referred to as SW 1) and a second stroke (hereinafter referred to as SW 2). The first stroke generates an instruction signal to start AE processing and the AF operation that are performed prior to the image capture operation. The second stroke generates an instruction signal to start an actual exposure operation.

(Description of Various Focus Evaluation Values)

Figure 2:
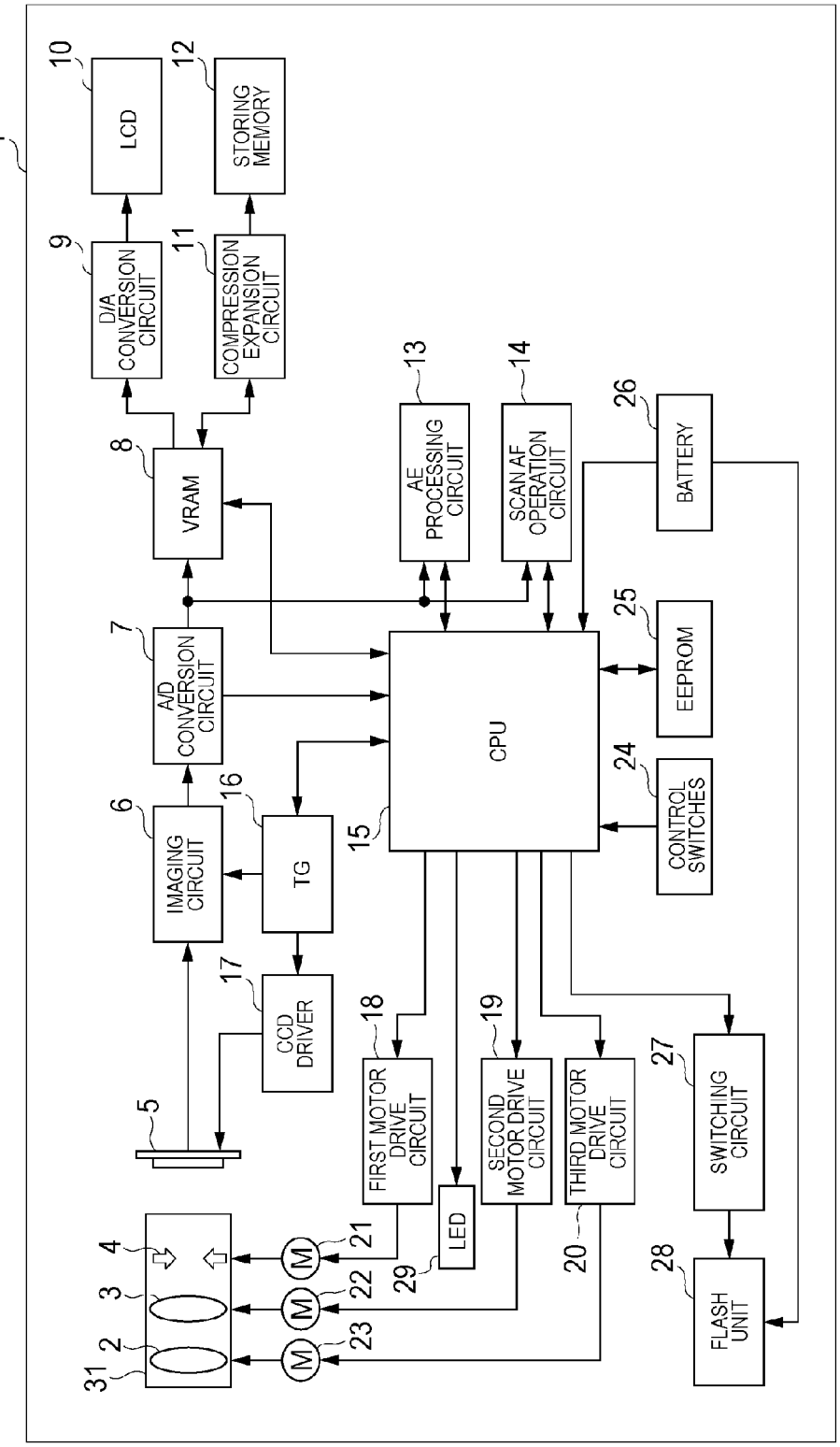
FIG. 2 is a block diagram of an imaging apparatus including a focus adjustment module according to the embodiment of the present invention.
Figure 3:
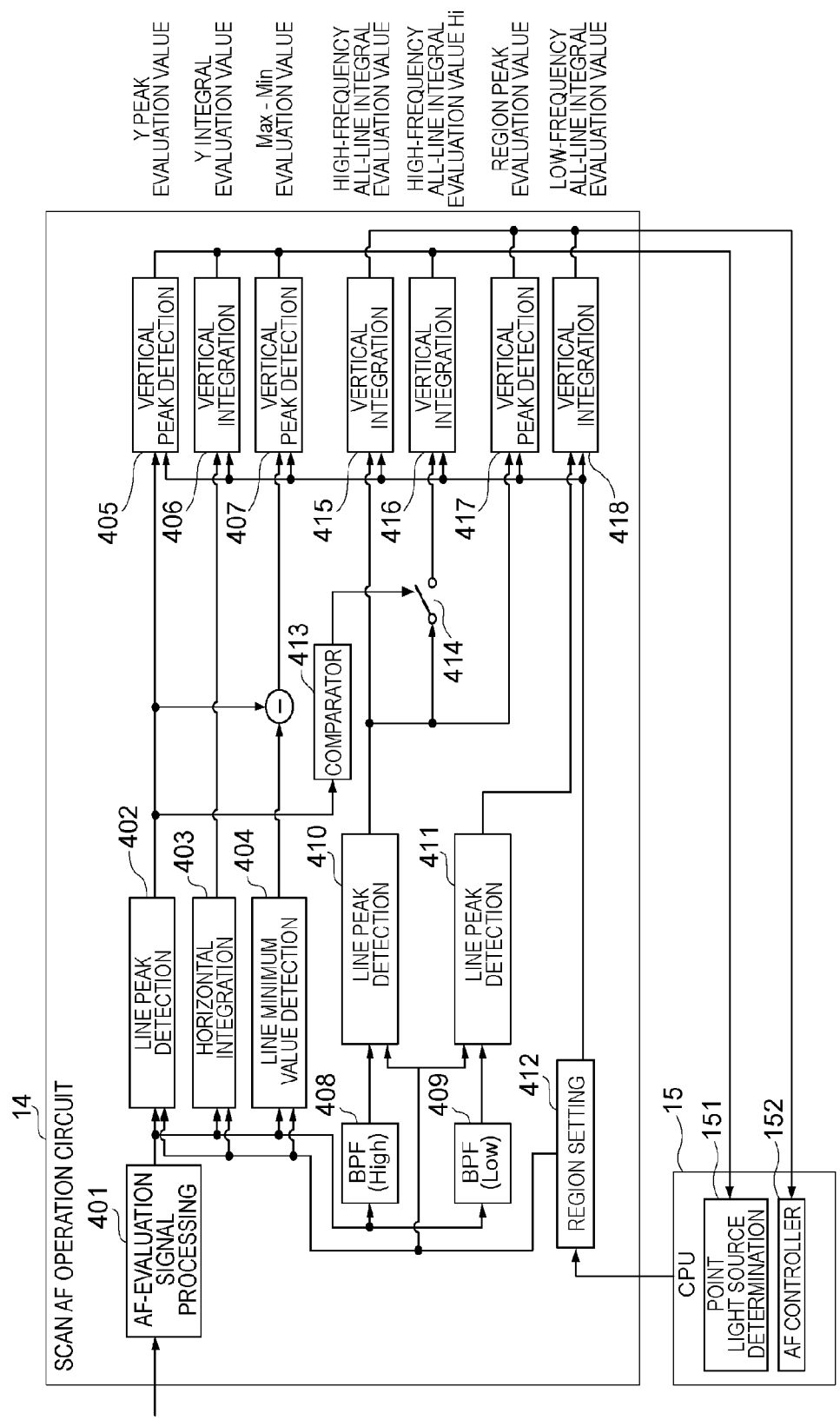
FIG. 3 is a block diagram of circuits for calculating various AF evaluation values according to the embodiment of the present invention.

With reference to FIG. 3, various AF evaluation values (focus evaluation values) calculated by the CPU 15 and the scan AF operation circuit 14 in FIG. 2 will now be described.

Upon input of the digital signal converted by the A/D conversion circuit 7 into the scan AF operation circuit 14, an AF-evaluation signal processing circuit 401 performs conversion to a luminance signal Y and gamma correction processing to enhance a low luminance component and suppress a high luminance component.

A calculation method for a Y peak evaluation value will now be described. The luminance signal Y, which has undergone the gamma correction, is input into a line peak detection circuit 402 for detecting a line peak value for each horizontal line. This circuit obtains a Y line peak value for each horizontal line in an AF evaluation range set by a region setting circuit 412. The output of the line peak detection circuit 402 is input into a vertical peak detection circuit 405.

This circuit performs peak hold in a vertical direction in the AF evaluation range set by the region setting circuit 412 to generate the Y peak evaluation value. The Y peak evaluation value is effective in determination of a high luminance subject and a low-light intensity subject.

A calculation method for a Y integral evaluation value will now be described. The luminance signal Y, which has undergone the gamma correction, is input into a horizontal integration circuit 403 for detecting an integrated value for each horizontal line. This circuit obtains an integrated value of Y for each horizontal line in the AF evaluation range set by the region setting circuit 412. The output of the horizontal integration circuit 403 is input into a vertical integration circuit 406. This circuit performs integration in the vertical direction in the AF evaluation range set by the region setting circuit 412 to generate the Y integral evaluation value. The Y integral evaluation value can be used for judgment of overall brightness in the AF evaluation range, which is a focus detection area.

A calculation method for a Max–Min evaluation value will now be described. The luminance signal Y, which has undergone the gamma correction, is input into the line peak detection circuit 402 to obtain the Y line peak value for each horizontal line in the AF evaluation range. The luminance signal Y, which has undergone the gamma correction, is also input into a line minimum value detection circuit 404. This circuit detects a Y minimum value for each horizontal line in the AF evaluation range of the luminance signal Y. The Y line peak value and the Y minimum value detected for each horizontal line are input into a subtracter to calculate (the line peak value−the minimum value) for inputting into a vertical peak detection circuit 407. This circuit performs the peak hold in the vertical direction in the AF evaluation range to generate the Max–Min evaluation value. The Max–Min evaluation value is effective in determination of low contrast and high contrast.

A calculation method for a region peak evaluation value will now be described. The luminance signal Y, which has undergone the gamma correction, is allowed to pass through a BPF (High) 408 to extract a spatial frequency component of a specific frequency band and generate a focus signal. The BPF (High) 408 has a frequency characteristic of primarily extracting a spatial frequency component of a higher frequency band in comparison with a BPF (Low) 409 to be described hereinafter. This focus signal is input into a line peak detection circuit 410 that is a peak hold means for detecting a line peak value for each horizontal line.

The line peak detection circuit 410 obtains a line peak value for each horizontal line in the AF evaluation range. The line peak value that has been obtained undergoes the peak hold in the AF evaluation range by a vertical peak detection circuit 417 to generate the region peak evaluation value. The region peak evaluation value does not change much with the subject moving in the AF evaluation range, and thus is effective in reactivation determination for proceeding from an in-focus state to processing to find an in-focus point again.

Calculation methods of a high-frequency all-line integral evaluation value and a high-frequency all-line integral evaluation value Hi will now be described. Similarly to the region peak evaluation value, the line peak detection circuit 410 obtains the line peak value for each horizontal line in the AF evaluation range. The line peak value is then input into a vertical integration circuit 415, which performs integration with respect to the number of all horizontal scanning lines in the vertical direction in the AF evaluation range to generate the high-frequency all-line integral evaluation value.

The high-frequency all-line integral evaluation value, which has a wide dynamic range due to the effect of the integration and high sensitivity, is effective as a main AF evaluation value for detecting an in-focus position. The BPF (High) corresponds to a spatial frequency component of the second frequency band, and the high-frequency all-line integral evaluation value corresponds to the second focus evaluation value.

The Y line peak value for each horizontal line is also input into a comparator 413, which has a predetermined threshold set by the CPU 15, to control a selector switch 414. This allows a line with a Y peak value exceeding the predetermined threshold to subject only its Y peak value to addition at the vertical integration circuit 416 to generate the high-frequency all-line integral evaluation value Hi. Comparison between the high-frequency all-line integral evaluation value and the high-frequency all-line integral evaluation value Hi allows determination whether the integral evaluation value has a large component due to a high luminance line or a large component due to another line.

A calculation method for a low-frequency all-line integral evaluation value will now be described. The luminance signal Y, which has undergone the gamma correction, is allowed to pass through the BPF (Low) 409 to extract a specific frequency component to generate a focus signal. The BPF (Low) 409 has a frequency characteristic of primarily extracting a lower frequency component in comparison with the BPF (High) 408 and not extracting a direct-current component (a component with 0 spatial frequencies). A line peak detection circuit 411 obtains a line peak value for each horizontal line in the AF evaluation range. The line peak value is then input into a vertical integration circuit 418, which performs integration with respect to the number of all horizontal scanning lines in the vertical direction in the AF evaluation range to generate the low-frequency all-line integral evaluation value.

The low-frequency all-line integral evaluation value has a wide dynamic range due to the effect of the integration and allows a change in evaluation value be detected in significant blurring. Thus, the low-frequency all-line integral evaluation value is effective as an evaluation value for detecting an in-focus direction in the significant blurring. The BPF (Low) corresponds to a spatial frequency component of the first frequency band, and the low-frequency all-line integral evaluation value corresponds to the first focus evaluation value.

The region setting circuit 412 generates a gate signal for the AF evaluation range for selecting a signal at a predetermined position in a screen set by the CPU 15.

The gate signal is input into the line peak detection circuit 402, the horizontal integration circuit 403, the line minimum value detection circuit 404, the line peak detection circuits 410 and 411, the vertical integration circuits 406, 415, 416, and 418, and the vertical peak detection circuits 405, 407, and 417. The gate signal is for controlling a timing at which the luminance signal Y is input to each circuit in such a manner that the focus evaluation values are generated with the luminance signal Y in the AF evaluation range.

An AF controller 152 receives the focus evaluation values and controls the focus drive motor 22 through the second motor drive circuit 19 to move the focus lens group 3 in an optical axis direction and thereby perform AF control.

In the first embodiment, different evaluation values are used in a manner depending on a defocus state, and the high-frequency all-line integral evaluation value, the low-frequency all-line integral evaluation value, and a point light source evaluation value for use in focus adjustment are referred to as the focus evaluation values. The point light source evaluation value will be described in detail hereinafter.

Although the AF evaluation values are calculated in the horizontal line direction in the present embodiment, these values may be calculated in the horizontal direction and/or in the vertical direction.

(Description of Flowchart)

With reference to FIG. 1, a focusing operation (the AF operation) of the imaging apparatus 1 having the configuration described above according to the embodiment of the present invention will now be described. FIG. 1 is a flowchart of a procedure of the AF operation of the focus adjustment module according to the embodiment of the invention. A control program associated with this operation is executed by the CPU 15.

Upon start of the AF operation, the region setting circuit 412 included in the CPU 15 sets AF evaluation ranges for performing the focus adjustment for a subject. In this processing of step S1, one distance measurement region is set in the image.

(Description of Setting of Focus Detection Area)

Figure 4:
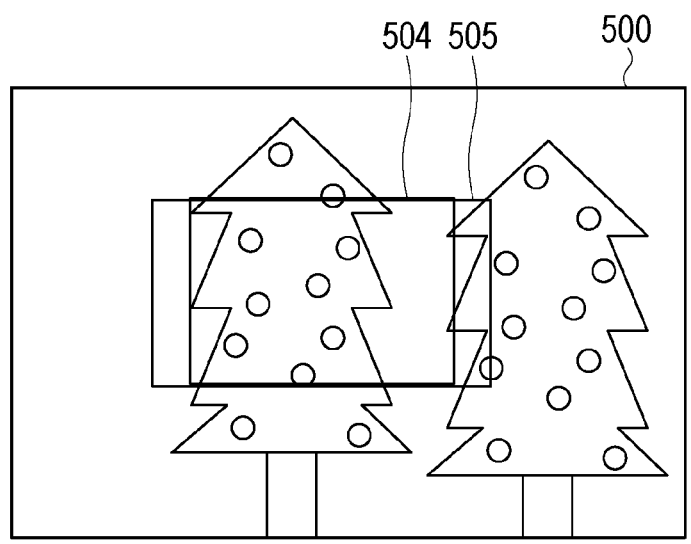
FIG. 4 is a diagram for describing setting of focus detection areas (AF evaluation ranges) according to the embodiment of the present invention.

FIG. 4 is a diagram for describing the setting of the AF evaluation ranges as focus detection areas. In FIG. 4, AF evaluation ranges 504 and 505 are set in the middle of an image capture screen 500. The AF evaluation ranges 504 and 505, which are the focus detection areas, are ranges for evaluating image signals for performing the focus adjustment in the AF operation to be described hereinafter. An object of the AF operation is to perform the focus adjustment on a subject aimed at by a user in the AF evaluation range 504 which is the focus detection area.

In the first embodiment, ornaments used to decorate trees are point light sources in the AF evaluation range 504, which is a second focus detection area. In comparison with the AF evaluation range 504, the AF evaluation range 505, which is a first focus detection area, is set longer in the horizontal direction in FIG. 4. The second focus detection area is narrower than the first focus detection area.

In the present embodiment, for a subject including a point light source, an AF evaluation range is set for each of evaluation values of different frequency bands. This will be described in detail hereinafter. The AF evaluation range 504 corresponds to a first range, and the AF evaluation range 505 corresponds to a second range.

With reference to FIG. 1, the description of the flowchart is resumed.

In step S2, point light source determination processing is performed at a point light source determiner 151 in the CPU 15 illustrated in FIG. 3. It is determined, in step S2, whether or not a point light source is included in a scene to be captured in order to set the evaluation values for use in the in-focus direction detection and approximate in-focus position detection. The determination processing will be described in detail hereinafter. The point light source determiner 151 corresponds to a luminance determination unit.

If it is determined, in step S3, that a point light source is not included in the AF evaluation ranges on the basis of the point light source determination performed in step S2, the flowchart proceeds to step S4. The high-frequency all-line integral evaluation value and the low-frequency all-line integral evaluation value, which are normal evaluation values, are selected as evaluation values for use in AF scan to be performed.

FIG. 5A is a graph of examples of the high-frequency all-line integral evaluation value and the low-frequency all-line integral evaluation value in the case of the AF evaluation ranges including no point light source.

A horizontal axis represents a focus lens position, and a vertical axis represents a focus evaluation value. In general, the high-frequency all-line integral evaluation value, with which a large amount of change can be detected only in proximity to an in-focus position, is used for the in-focus position detection. The low-frequency all-line integral evaluation value, with which an amount of change can be detected with a large defocus amount, is used for the in-focus direction detection.

If it is determined that a point light source is included in the AF evaluation ranges, the flowchart proceeds to step S5. The high-frequency all-line integral evaluation value and the point light source evaluation value are selected as evaluation values for use in the AF scan to be performed. The point light source evaluation value is calculated with an expression described below.

Point light source evaluation value=high-frequency all-line integral evaluation value−low-frequency all-line integral evaluation value+$A$  Expression 1

In expression 1, $A$ is an offset value to be added so that the point light source evaluation value is not a negative value.

In other words, a difference value between the high-frequency all-line integral evaluation value, which is the second focus evaluation value, and the low-frequency all-line integral evaluation value, which is the first focus evaluation value, is used to calculate the point light source evaluation value, which is the third focus evaluation value.

(Description of Point Light Source Evaluation Value)

FIGS. 5B and 5C are each a diagram of examples of the high-frequency all-line integral evaluation value, the low-frequency all-line integral evaluation value, and the point light source evaluation value in the case of a point light source included in the AF evaluation ranges. The horizontal axis represents a focus lens position, and the vertical axis represents a focus evaluation value.

FIG. 5B is a diagram of a case where the number of pixels saturated by the point light source in the AF evaluation ranges is relatively small. In comparison with the case with no point light source (FIG. 5A), the high-frequency all-line integral evaluation value has a wider evaluation value form and less steepness in proximity to an in-focus position.

Hence, the high-frequency all-line integral evaluation value, which has been used for the in-focus position detection in the case with no point light source (FIG. 5A), may pose a possible deterioration in accuracy of the detection. In the present invention, the point light source evaluation value, which is marked with a broken line in FIG. 5B, is used in the in-focus position detection so that high accuracy of the in-focus position detection can be maintained in the case with a point light source.

Additionally, in comparison with the case with no point light source (FIG. 5A), the low-frequency all-line integral evaluation value has a smaller amount of change in evaluation value and a valley in proximity to the in-focus position. Hence, the low-frequency all-line integral evaluation value, which has been used for the in-focus direction detection in the case with no point light source (FIG. 5A), may pose a possible deterioration in accuracy of the detection.

In the present invention, the high-frequency all-line integral evaluation value is used to perform the direction detection. This is because, in the case with a large defocus amount, the high-frequency all-line integral evaluation value exhibits an increase in evaluation value near the in-focus position more reliably in comparison with the low-frequency all-line integral evaluation value. The point light source evaluation value reaches its relative minimum in some cases with a large defocus amount and may exhibit increases in evaluation value in both the in-focus direction and in the opposite direction, and thus it is not used for the in-focus direction detection.

FIG. 5C is a diagram of a case where the number of pixels saturated by the point light source in the AF evaluation ranges is larger than that of FIG. 5B. In comparison with the state in FIG. 5B, the high-frequency all-line integral evaluation value has a further wider evaluation value form and a valley in proximity to an in-focus position.

Thus, the use of the high-frequency all-line integral evaluation value in the in-focus position detection may lead to a wrong relative maximum for the in-focus position detection. In the present invention, the point light source evaluation value, which is marked with a broken line in FIG. 5C, is used in the in-focus position detection so that the high accuracy of the in-focus position detection can be maintained in the case with a point light source.

The low-frequency all-line integral evaluation value has a form that monotonously increases across a moveable range of the focus lens group with a relative minimum at the in-focus position. Thus, the use of the low-frequency all-line integral evaluation value in the in-focus direction detection may results in erroneous detection. In the present invention, the high-frequency all-line integral evaluation value is used in the direction detection as in the case with FIG. 5B.

In the present invention, the AF evaluation range 504 is used in the calculation of the high-frequency all-line integral evaluation value, and the AF evaluation range 505, which is set wider, is used in the calculation of the low-frequency all-line integral evaluation value. A reason for setting the AF evaluation range 505 wider will now be described. The point light source evaluation value calculated according to the present invention is used in the in-focus position detection and thus desirably has a large amount of change in proximity to an in-focus position (a relative maximum).

To acquire the point light source evaluation value as described above, it is preferable that the high-frequency all-line integral evaluation value be formed to have a projection and have a largest possible amount of change, and it is preferable that the low-frequency all-line integral evaluation value be formed to have a depression (a valley) and have a largest possible amount of change. To achieve this by the setting of an AF evaluation range, a narrow AF evaluation range, which minimizes the effect of a point light source, is desirably set for the high-frequency all-line integral evaluation value, and a wider AF evaluation range, which maximizes the effect of the point light source, is desirably set for the low-frequency all-line integral evaluation value. Thus, in the present invention, the AF evaluation ranges for use in the calculation of the evaluation values have different widths as described above.

As described above, the point light source evaluation value, which is a difference calculated between the high-frequency all-line integral evaluation value with a narrow AF evaluation range and the low-frequency all-line integral evaluation value with a wide AF evaluation range, is used in the in-focus position detection in the embodiment. This allows acquisition of an evaluation value form with a stable projection in proximity to an in-focus position regardless of the size, the quantity, and the brightness of a point light source in the AF evaluation ranges as illustrated in FIGS. 5B and 5C, thereby achieving the high accuracy of the in-focus position detection.

Figure 11A:
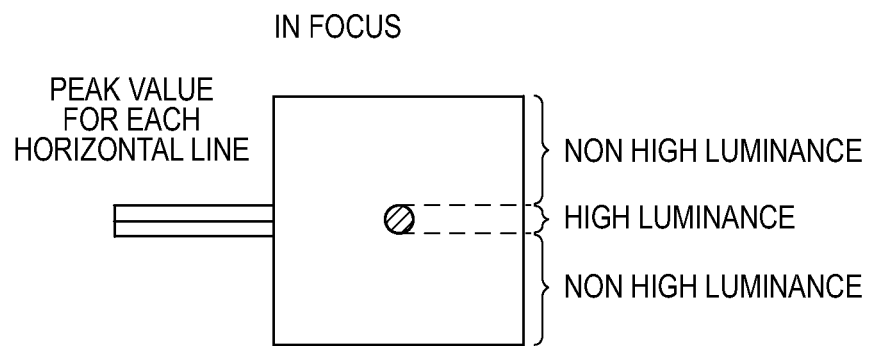
FIG. 11A is a diagram of an example in-focus image of a point light source subject in the related art.
Figure 11B:
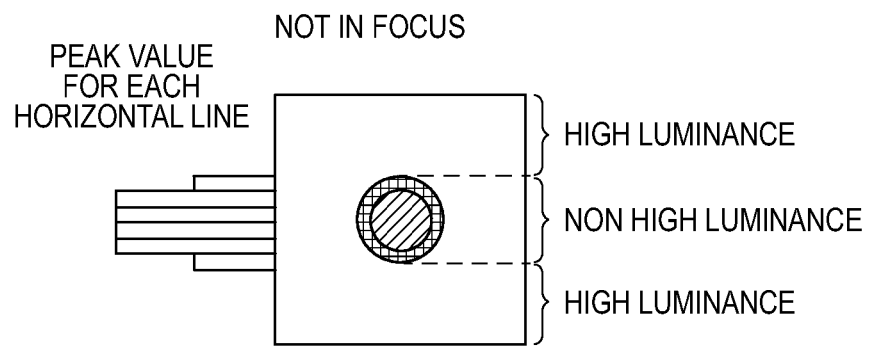
FIG. 11B is a diagram of an example not-in-focus image of a point light source subject in the related art.
Figure 12:
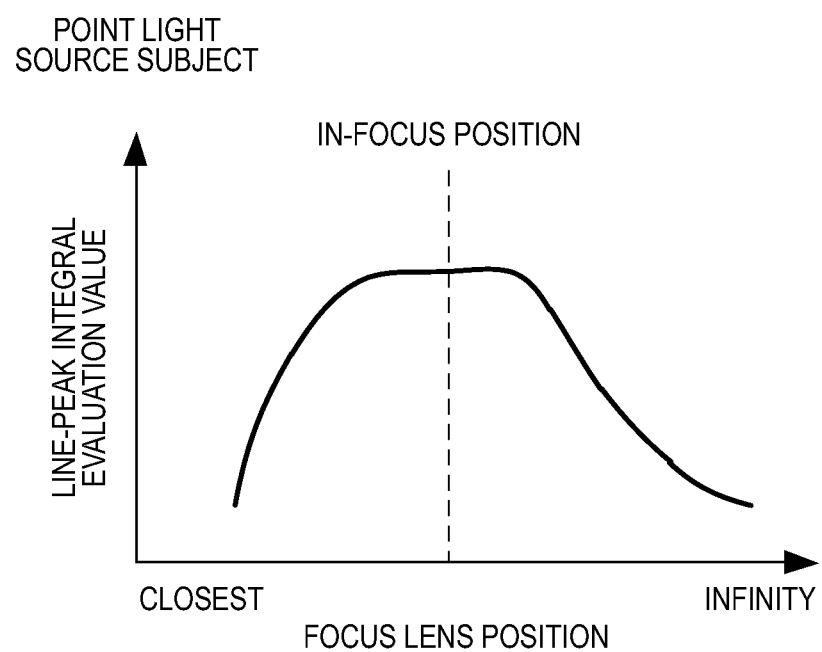
FIG. 12 is a graph for describing a case in the related art in which a minimum position of the area of a high luminance portion is not an in-focus position.

Alternatively, the high-frequency all-line integral evaluation value and the low-frequency all-line integral evaluation value described above may be each normalized with the Y integral evaluation value. With a point light source subject, the Y integral evaluation value is larger in a not-in-focus image than in an in-focus image as described with FIG. 11. Thus, the normalization of the high-frequency all-line integral evaluation value and the low-frequency all-line integral evaluation value with the Y integral evaluation value can lead to higher likelihood that a relative maximum, which is a peak value, is reached in proximity to the in-focus position.

With reference to FIG. 1, the description of the flowchart is resumed.

In step S6, the AF scan (a focus adjustment operation) is performed while the focus evaluation values are calculated in the distance measurement region set in step S1. In the AF scan, while the focus lens group 3 is moved from a scan start position to a scan end position by predetermined quantity, the scan AF operation circuit 14 allows the focus evaluation values described above at each focus lens group position to be stored in the CPU 15. The scan end position may be set before the AF scan is started. Alternatively, the scan may be ended when passing of a peak position of an evaluation value is detected.

In the case where the scan is ended when the peak position of an evaluation value has been passed, the evaluation value to detect a peak position is changed on the basis of a result of the point light source determination processing in step S2. If no point light source is included in the AF evaluation ranges, the high-frequency all-line integral evaluation value is used to end the scan. If a point light source is included in the AF evaluation ranges, the scan is ended when the peak positions of both the high-frequency all-line integral evaluation value and the point light source evaluation value have been detected.

Such a method as described in JP 2012-137530 A with reference to FIGS. 8 to 13 may be used as a detailed procedure of the AF scan operation using the high-frequency all-line integral evaluation value.

The flowchart then proceeds to step S7 in which point light source determination processing for the in-focus position detection is performed at the point light source determiner 151. This processing is performed because in some cases it may be determined that a point light source is included due to a saturated pixel occurred in proximity to an in-focus position, although it has been determined at the start of the AF that point light source is absent in the AF evaluation ranges because a saturated pixel cannot be detected with the luminance signal due to a large defocus amount. The processing is described in detail hereinafter. The point light source determiner 151 corresponds to the luminance determination unit.

If it is determined, in step S8, that a point light source is absent on the basis of the point light source determination performed in step S7, the flowchart proceeds to step S9. If it is determined that a point light source is present, the flowchart proceeds to step S10. In step S9, the high-frequency all-line integral evaluation value is selected as a normal evaluation value for the absence of a point light source. In step S10, the point light source evaluation value is selected as an evaluation value for the presence of a point light source.

Then, in step S11, reliability evaluation is performed on a relative maximum of the evaluation value selected in step S9 or S10. Here, a position of the focus lens group 3 at which the focus evaluation value reaches its relative maximum, which is a peak value, is calculated. The reliability is also evaluated on a change curve of the focus evaluation value in proximity to the relative maximum. The reliability evaluation is performed to see if the obtained focus evaluation value has an adequate change curve form to acquire a sufficient in-focus state of the subject.

Such a method as described in JP 2010-078810 A with reference to FIGS. 10 to 13 may be used as a detailed procedure of the reliability determination.

In other words, whether or not the focus evaluation value indicative of an in-focus state has a reliably high projection is judged on the basis of the difference between a maximum value and a minimum value of the focus evaluation value, the length of a portion inclined with a slope equal to or more than a certain value (SlopeThr), and a gradient of the inclined portion. This allows the reliability determination.

If the reliability is determined in step S12 on the basis of a result of the reliability determination in step S11, the flowchart proceeds to step S13 in which the CPU 15 uses the all-line integral evaluation value or the point light source evaluation value to compute a peak position. Then, in step S14, the AF controller 152 drives the focus lens group 3 to a position corresponding to the peak position. If a plurality of relative maxima is present in the focus evaluation value determined reliable in step S11, a position of a relative maximum indicative of a focus lens position toward the closest is set as the in-focus position to perform the lens driving. Then, in step S15, the CPU 15 performs an in-focus indication to end the AF operation.

If the reliability is not determined in step S12 on the basis of the result of the reliability determination in step S11, the flowchart proceeds to step S16. The CPU 15 drives the focus lens group 3, in step S16, to a preset fixed point which is a position with a high likelihood of the presence of a subject. Then, in step S17, the CPU 15 performs a not-in-focus indication to end the AF operation.

(Description of Point Light Source Determination Processing at Start of AF)

The point light source determination processing performed at the start of AF in step S2 in FIG. 1 will now be described with reference to FIG. 6.

It is judged in step S21 whether a proportion of a high luminance line to the focus evaluation value is large. If it is large, the flowchart proceeds to step S22. If it is small, the flowchart proceeds to step S26. The proportion of a high luminance line to the focus evaluation value is obtained through the comparison between the all-line integral evaluation value and the all-line integral evaluation value Hi. Closeness of the all-line integral evaluation value to the all-line integral evaluation value Hi indicates that the proportion of the high luminance line peak value to the all-line integral evaluation value is large.

With the presence of a point light source subject, the proportion of the high luminance line peak value to the integral evaluation value is large. This can provide one factor to judge the presence of a point light source subject. Note that if a predetermined-line integral evaluation value is used, the all-line integral evaluation value Hi is generated but the all-line integral evaluation value is not generated. The comparison between the all-line integral evaluation value and the all-line integral evaluation value Hi cannot be performed in this case.

Thus, when the selector switch is initially switched from the use of the all-line integral evaluation value to the use of the predetermined-line integral evaluation value, the all-line integral evaluation value Hi at this point in time is retained. This retained value is compared to a newly acquired all-line integral evaluation value Hi. If the newly acquired all-line integral evaluation value Hi exhibits a large reduction amount, the proportion of the high luminance line to the focus evaluation value is assumed to be not large for the control.

Then, it is judged, in step S22, whether the Y peak evaluation value is larger than a predetermined value because the presence of a point light source subject involves an increase in the Y peak evaluation value. If the Y peak evaluation value is larger, the flowchart proceeds to step S23. If the Y peak evaluation value is smaller, the flowchart proceeds to step S26. It is judged, in step S23, whether the Max–Min evaluation value is larger than a predetermined value because the presence of a point light source subject involves a large difference between a maximum luminance and a minimum luminance in a line with a point light source. If the Max–Min evaluation value is larger, the flowchart proceeds to step S24, and if it is smaller, the flowchart proceed to step S26. It is judged, in step S24, whether the Y integral evaluation value is small because capturing of a point light source subject leads to darkness across a screen. If the Y integral evaluation value is small, the flowchart proceeds to step S25, and if it is large, the flowchart proceeds to step S26.

On the basis of the processing described above, it is judged, in step S25, that a point light source is present. This processing is finished to proceed with the evaluation value setting for the presence of a point light source described above (step S5 in FIG. 1). It is judged, in step S26, that a point light source is absent. This processing is finished to proceed with the normal evaluation value setting (step S4 in FIG. 1).

Note that the point light source determination (S21 to S24) may not be performed in its entirety. If it is determined that a point light source is present in a scene after some of the determination steps have been performed, others may be eliminated. This allows the point light source determination processing to be performed quickly.

(Description of Point Light Source Determination Processing for In-Focus Position Detection)

The point light source determination processing for the in-focus position detection to be performed in step S7 in FIG. 1 will now be described with reference to FIG. 7. Like steps of the point light source determination processing performed in this subroutine are indicated with like reference figures as in the subroutine illustrated in FIG. 6. The point light source determination processing for the in-focus position detection illustrated in FIG. 7 includes steps similar to those in FIG. 6 because the accuracy of the point light source determination may differ in a manner depending on the defocus state. With a large defocus amount, a point light source is blurred significantly, precluding saturation and thereby leading to a failure of determination of the point light source. Thus, performing of the point light source determination processing again in proximity to the in-focus position in step S7 in FIG. 1 provides improved accuracy for the point light source determination.

Figure 6:
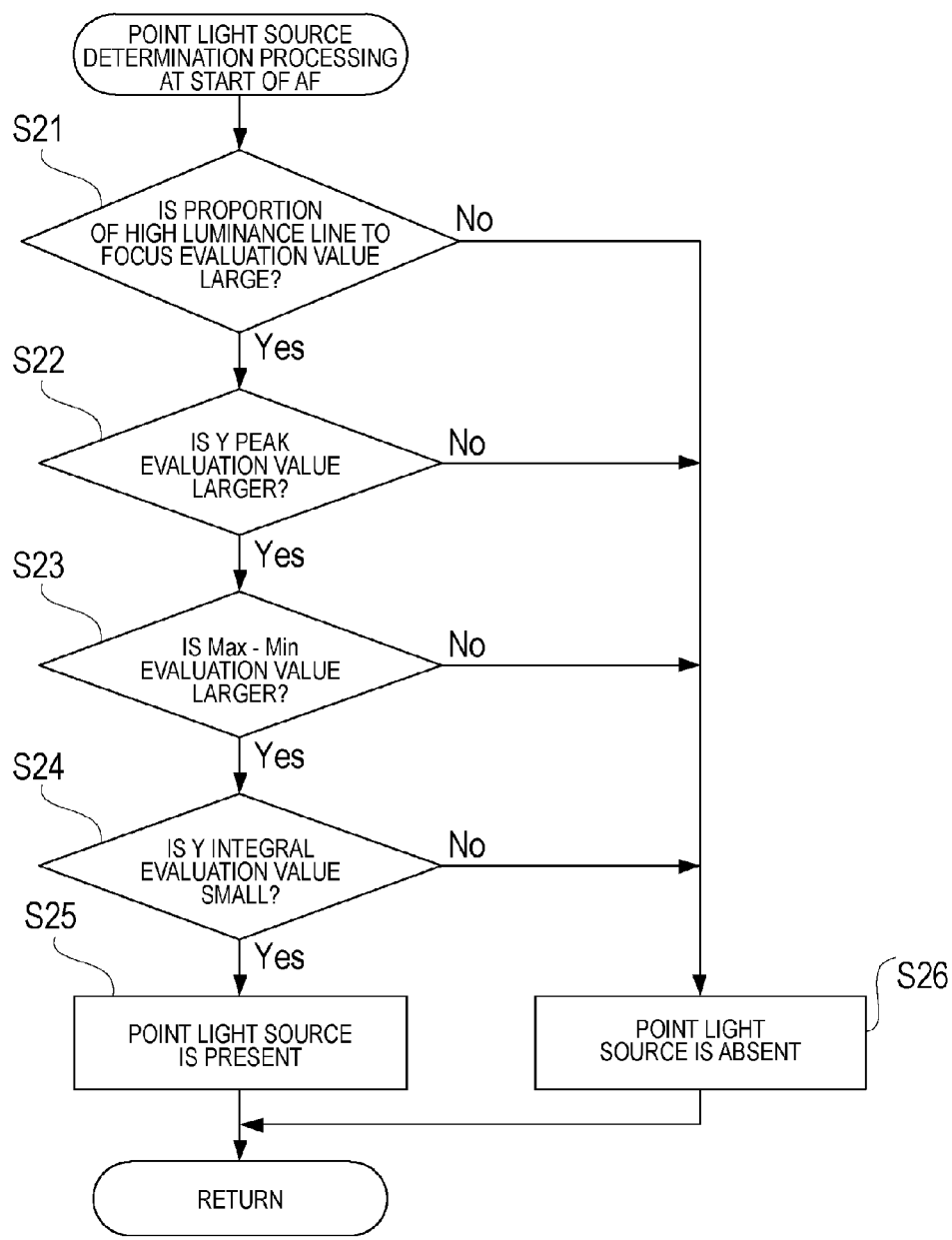
FIG. 6 is a flowchart of point light source determination processing at start of AF performed in step S2 in FIG. 1 according to the embodiment of the present invention.
Figure 7:
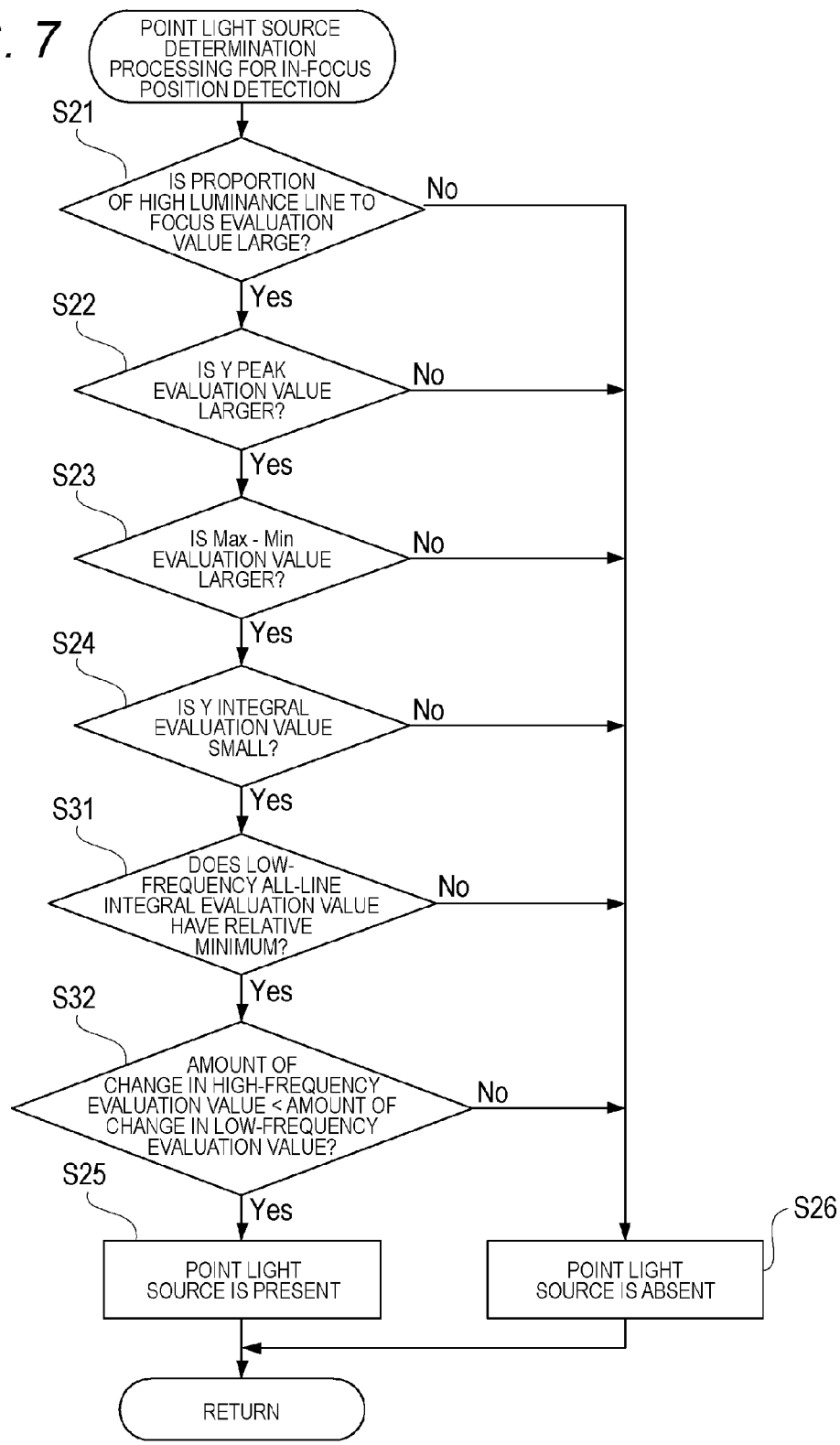
FIG. 7 is a flowchart of point light source determination processing for in-focus position detection performed in step S7 in FIG. 1 according to the embodiment of the present invention.

The subroutine of FIG. 7 differs from that of FIG. 6 in two additional steps to determine a point light source. Upon the end of step S24, if it is determined that Y integral evaluation value is small, the flowchart proceeds to step S31. The CPU 15 determines, in step S31, whether the low-frequency all-line integral evaluation value has a relative minimum. As described above, this is because the low-frequency all-line integral evaluation value is more susceptible to a point light source and thus tends to be formed to have a valley and reach a relative minimum in proximity to an in-focus position.

This feature is used to determine a point light source in step S31. It is determined whether a relative minimum of the low-frequency all-line integral evaluation value is detected in proximity to a focus lens group position at which the high-frequency all-line integral evaluation value or the point light source evaluation value has a relative maximum, which is a peak value. If a relative minimum is detected, the flowchart proceeds to step S32, and if it is not detected, the flowchart proceeds to step S26. The CPU 15 corresponds to a relative minimum determination unit.

It is determined, in step S32, whether or not the absolute value of an amount of change in the high-frequency all-line integral evaluation value is smaller than the absolute value of an amount of change in the low-frequency all-line integral evaluation value in proximity to a focus lens group position at which the low-frequency all-line integral evaluation value has a relative minimum. This determination may be performed in proximity to a focus lens group position corresponding to a relative minimum of the low-frequency all-line integral evaluation value, or it may be performed in proximity to a focus lens group position at which the high-frequency all-line integral evaluation value or the point light source evaluation value has a relative maximum.

As described above, under significant effect of a point light source as illustrated in FIG. 5C, an amount of change in the high-frequency all-line integral evaluation value is smaller than an amount of change in the low-frequency all-line integral evaluation value in proximity to an in-focus position. This feature is used to determine a point light source in this step. If an amount of change in the high-frequency all-line integral evaluation value is smaller than an amount of change in the low-frequency all-line integral evaluation value, the flowchart proceeds to step S25, and if this relationship is not detected, the flowchart proceeds to step S26.

On the basis of the processing described above, it is judged, in step S25, that a point light source is present. This processing is finished to proceed with the evaluation value setting for the presence of a point light source described above (step S10 in FIG. 1). It is judged, in step S26, that a point light source is absent. This processing is finished to proceed with the normal evaluation value setting (step S9 in FIG. 1).

Note that the point light source determination (S21 to S32) may not be performed in its entirety. If it is determined that a point light source is present in a scene after some of the determination steps have been performed, others may be eliminated. This allows the point light source determination processing to be performed quickly.

Although the point light source determination is performed only at the start of AF and for the in-focus position detection in the first embodiment, it may be performed more than once during the AF scan operation. Performing the point light source determination through calculation with evaluation values acquired at each focus lens group position leads to an increase in computation load but allows further accuracy for the point light source determination.

(Description of In-Focus Level)

The point light source determination may be performed only in proximity to an in-focus position where the effect of a point light source is more prominent. To judge proximity to an in-focus position, an in-focus level, which is calculated with an expression described below, may be used.

In-focus level=region peak evaluation value/Max−Min evaluation value     Expression 2

The in-focus level, which is calculated with the region peak evaluation value, is insusceptible to movement of a subject and camera shake. Additionally, the in-focus level is normalized with the Max−Min evaluation value and thus is insusceptible to the magnitude of contrast of a subject. If an in-focus level calculated through expression 2 is higher than a predetermined threshold, it is judged to be in proximity to an in-focus position, and the point light source determination is performed. In this manner, the point light source determination can be performed only when there is a demand, leading to efficiency without an increase in computation load.

Some steps (steps S31 and S32) performed in the point light source determination processing for the in-focus position detection have not been performed during the point light source determination processing at the start of AF, because the focus lens group has not moved at the start of AF. In a case where a wobbling operation, which is a publicly known AF control technique, is performed, a point light source determination processing similar to that for the in-focus position detection may be performed at the start of AF. In such a case, a point light source can be determined accurately with the AF started from proximity to an in-focus position. AF processing for moving image capture, such as the wobbling operation, is described in JP 2012-137530 A and thus its description is not provided herein.

(Description of Frequency Difference)

Figure 8:
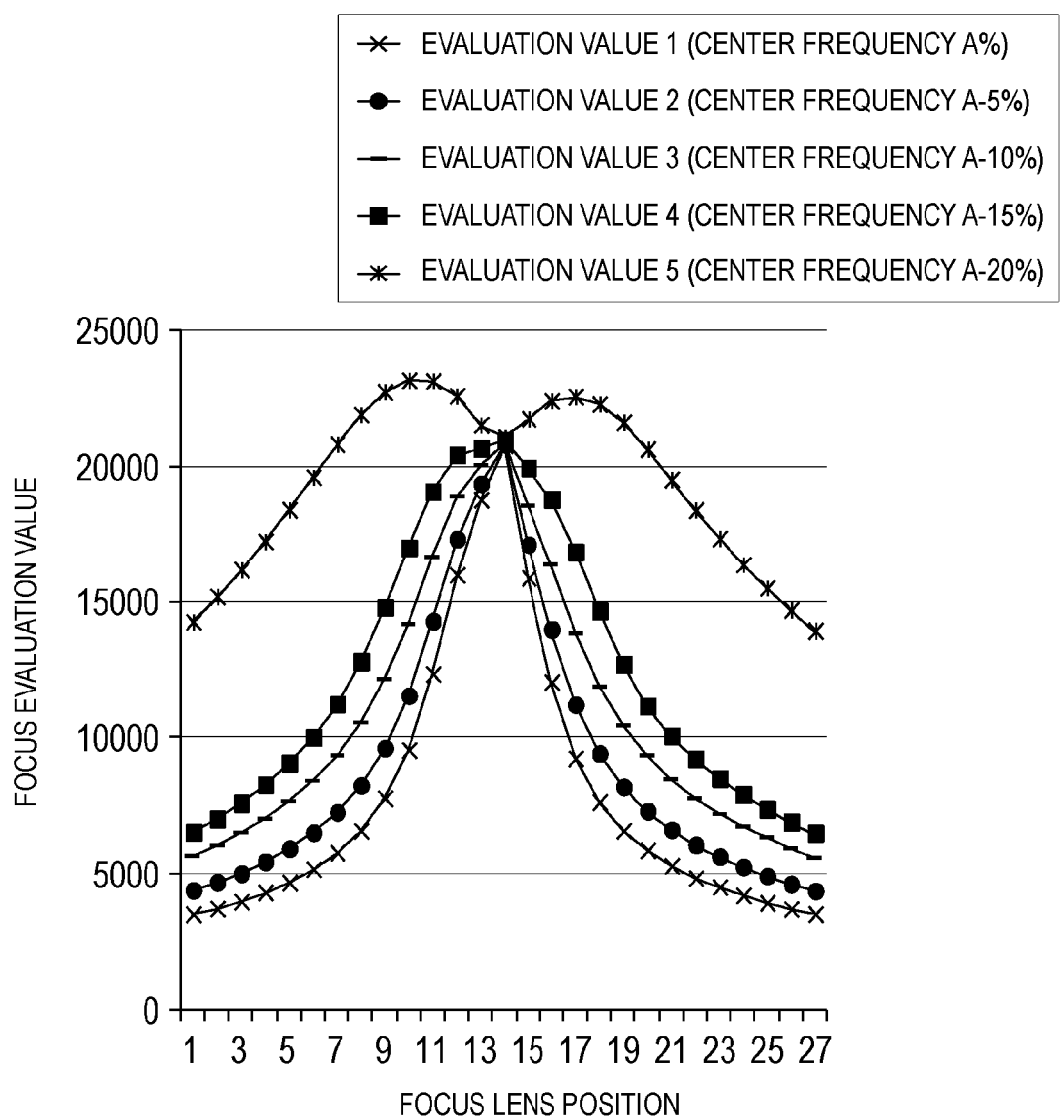
FIG. 8 is a graph of example forms of a focus evaluation value for each center frequency of BPFs with a certain point light source subject.
Figure 9:
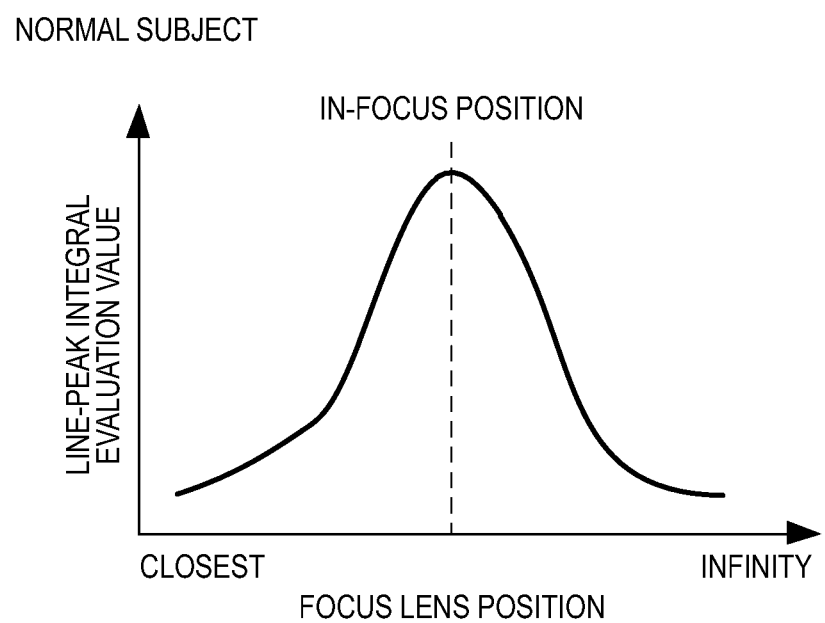
FIG. 9 is a graph of relationship in the related art between the line-peak integral evaluation value and the focus lens position for a normal subject.
Figure 10:
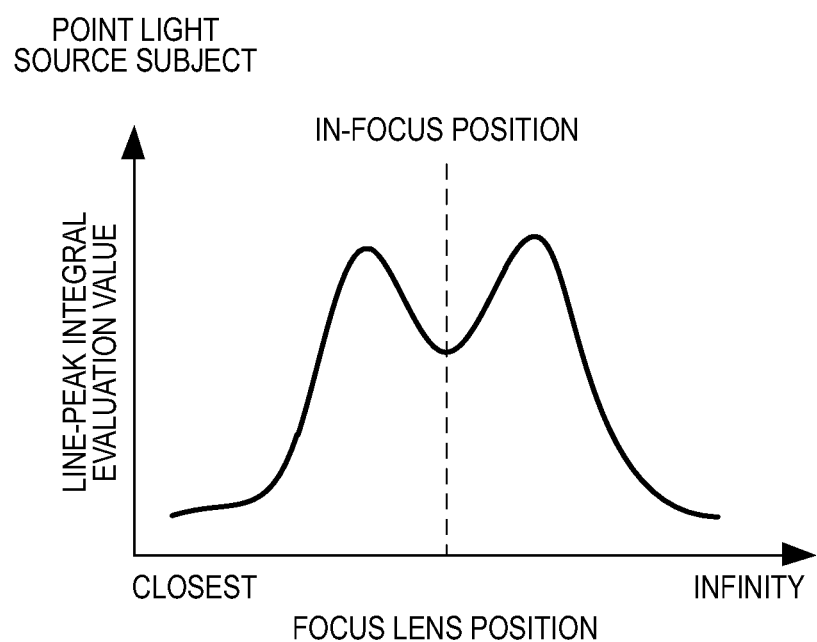
FIG. 10 is a graph of relationship in the related art between the line-peak integral evaluation value and the focus lens position for a point light source subject.

It is preferable that a difference between primary frequencies of the BPFs for the calculation of the high-frequency all-line integral evaluation value and the low-frequency all-line integral evaluation value according to the present embodiment be equal to or more than 10% with respect to the Nyquist frequency calculated with a pixel pitch on an image sensor. FIG. 8 is a graph of a form of an all-line integral evaluation value (a focus evaluation value) at each center frequency of a BPF with a certain point light source subject. In FIG. 8, a horizontal axis represents a focus lens group position, and a vertical axis represents a focus evaluation value.

In the graph of FIG. 8, five curves are derived from different primary frequencies of the BPFs for the calculation of the all-line integral evaluation value. A primary frequency of a BPF used for an evaluation value 2 is 5% lower than that for an evaluation value 1 with respect to the Nyquist frequency. Similarly, for evaluation values 3 to 5, primary frequencies of their respective BPFs are lowered by 5% with respect to the Nyquist frequency. As illustrated in the diagram, it is only the evaluation value 5 that has a valley. An evaluation value 4 has a small change in evaluation value in proximity to a relative maximum and thus has an evaluation value form that may pose a possible deterioration in accuracy of the in-focus position detection.

In such a case, selection of the evaluation value 4 as the high-frequency all-line integral evaluation value and selection of the evaluation value 5 as the low-frequency all-line integral evaluation value allows the point light source evaluation value, which is the difference between the evaluation value 4 and the evaluation value 5, to have a projection in proximity to an in-focus position, thereby enabling the in-focus position detection. Use of the evaluation value 1, 2, or 3, which has a higher primary frequency, as the high-frequency all-line integral evaluation value, however, allows the point light source evaluation value to have a form with a larger amount of change in proximity to the in-focus position, thereby improving the accuracy of the in-focus position detection. Although a primary frequency and an evaluation value form for the calculation of an all-line integral evaluation value vary with a condition of a point light source (quantity, size, brightness, or the like), it is preferable that a high frequency BPF and a low frequency BPF with a difference equal to or more than approximately 10% of the Nyquist frequency be used, in general.

As described above, the focus adjustment using the point light source evaluation value, which is a difference between the high-frequency all-line integral evaluation value and the low-frequency all-line integral evaluation value, is performed. Thus, an in-focus position can be detected accurately in a case, such as with a point light source, in which an evaluation value form used for the contrast AF has a small change in proximity to the in-focus position.

Additionally, by performing the point light source determination on the basis of whether or not the low-frequency all-line integral evaluation value has a relative minimum, the point light source determination can be performed with further improved accuracy, allowing the in-focus position detection to use the point light source evaluation value effectively.

In the case of the low-frequency all-line integral evaluation value having a relative minimum, the absolute value of an amount of change in the high-frequency all-line integral evaluation value can be compared to the absolute value of an amount of change in the low-frequency all-line integral evaluation value in proximity to a focus lens group position corresponding to the relative minimum to perform the point light source determination with further improved accuracy.

Additionally, the evaluation values (the high-frequency all-line integral evaluation value and the low-frequency all-line integral evaluation value) used for the absence of a point light source determined by the point light source determination are identical to those (the point light source evaluation value and the high-frequency all-line integral evaluation value) used for the presence of a point light source determined by the point light source determination. Thus, the same types of evaluation values are calculated regardless of a result of the point light source determination, allowing the computation load to be reduced.

Different evaluation values, however, may be calculated in a manner depending on whether or not a point light source is present. In this case, although the computation load is increased, an optimal evaluation value can be used in a manner depending on whether or not a point light source is present.

In the present embodiment, the luminance determination unit is included to determine whether or not a subject with luminance equal to or more than a predetermined value is present in at least one of the first focus detection area and the second focus detection area. If it is determined that a subject with luminance equal to or more than the predetermined value is present in at least one of the first focus detection area and the second focus detection area, the in-focus position calculation unit performs the calculation of an in-focus position.

In the present embodiment, the relative minimum determination unit is included to determine whether or not the first focus evaluation value has a relative minimum. If it is determined that the first focus evaluation value has a relative minimum, the luminance determination unit determines that a subject with luminance equal to or more than the predetermined value is present in at least one of the first focus detection area and the second focus detection area.

In the present embodiment, when the first focus evaluation value has the relative minimum, the absolute value of an amount of change in the second focus evaluation value in a region including the relative minimum may be smaller the absolute value of an amount of change in the first focus evaluation value in the region including the relative minimum. It is determined, in this case, that a subject with luminance equal to or more than the predetermined value is present in at least one of the first focus detection area and the second focus detection area.

In the present embodiment, the luminance determination unit may determine that a subject with luminance equal to or more than the predetermined value is not present in at least one of the first focus detection area and the second focus detection area. A direction determination unit is included to determine a direction in which the focus adjustment unit is driven using an amount of change in the first focus evaluation value in this case.

In the present embodiment, if the luminance determination unit determines that a subject with luminance equal to or more than the predetermined value is not present in at least one of the first focus detection area and the second focus detection area, the in-focus position is calculated in accordance with a position at which the second focus evaluation value reaches its peak value.

In the present embodiment, a difference between a center frequency of the first frequency band and a center frequency of the second frequency band is equal to or more than 10% with respect to the Nyquist frequency calculated with a pixel pitch of an image sensor.

Second Embodiment

A modification of the foregoing calculation method for the point light source evaluation value will now be described. An object of the present invention to provide in-focus position detection with high accuracy is achieved by using a magnitude of the high-frequency all-line integral evaluation value in relation to the low-frequency all-line integral evaluation value as the point light source evaluation value. Thus, an evaluation value calculated as the point light source evaluation value is not limited to those calculated with expression 1. One such value can be calculated with, for example, an expression described below.

Point light source evaluation value=high-frequency all-line integral evaluation value/low-frequency all-line integral evaluation value$\times B$    Expression 3

In other words, the point light source evaluation value, which is the third focus evaluation value, is calculated by obtaining a ratio of the high-frequency all-line integral evaluation value, which is the second focus evaluation value, and the low-frequency all-line integral evaluation value, which is the first focus evaluation value.

The low-frequency all-line integral evaluation value is a denominator in expression 3, and the high-frequency all-line integral evaluation value is a numerator in expression 3.

In expression 3, B is a gain value for multiplication to prevent the point light source evaluation value from becoming excessively small.

Additionally, a plurality of point light source evaluation values may be calculated. For example, different frequency components may be extracted by BPFs that are used for the calculation of the low-frequency all-line integral evaluation value so that a first low-frequency all-line integral evaluation value and a second low-frequency all-line integral evaluation value are calculated, and these values may be used to calculate the plurality of point light source evaluation values with expression 1 and expression 3. In such a case, an evaluation value with higher reliability with regard to the evaluation value form may be used to perform the in-focus position detection. Similarly, a plurality of high-frequency all-line integral evaluation values may be calculated to calculate the plurality of point light source evaluation values.

Additionally, another method to calculate a plurality of low-frequency all-line integral evaluation values is to calculate a first low-frequency all-line integral evaluation value and a second low-frequency all-line integral evaluation value with different AF evaluation ranges. As described above, a wide range is desirably used for the low-frequency all-line integral evaluation value to improve the susceptibility to a point light source. An adverse effect, however, may result from different ranges used for the calculation of the high-frequency all-line integral evaluation value and the low-frequency all-line integral evaluation value. For example, an evaluation value form with an extremum (a valley) at a wrong position may possibly result due to the effect of a subject that is not present in an evaluation range for the high-frequency all-line integral evaluation value but is present in an evaluation range for the low-frequency all-line integral evaluation value.

Thus, a first low-frequency all-line integral evaluation value, which is calculated with an evaluation range identical to a range used for the high-frequency all-line integral evaluation value, and a second low-frequency all-line integral evaluation value, which is calculated with an evaluation range wider than a range used for the high-frequency all-line integral evaluation value, may be both calculated. In this case, these two low-frequency all-line integral evaluation values are used to calculate two point light source evaluation values with expression 1 and expression 3 as described above. Through the calculation of an in-focus position by using a point light source evaluation value with further improved reliability, the in-focus position detection can be performed with further improved accuracy.

(Description of Program)

An object of the present invention can be also attained by supplying a storage medium having a software program code to achieve functions of the embodiments recorded therein to a system or an apparatus, and allowing the system or a computer to read the program code stored in the storage medium for execution.

In this case, the program code read from the storage medium achieves the novel functions of the present invention, and the storage medium having the program code stored therein and the program make up the present invention.

As the storage medium to supply the program code, for example, a flexible disk, a hard disk, an optical disk, a magneto-optical disk, a CD, a DVD, a magnetic tape, a nonvolatile memory card, and a ROM may be used.

Additionally, execution by the computer of the program code, which has been read, not only achieves the functions of the embodiments described above but also allows an OS, which works on the computer in accordance with an instruction of the program code, to perform part or all of actual processing. A case in which the functions of the embodiments described above are achieved by this processing is included.

Furthermore, the program code, which has been read from the storage medium, is written in a memory, which is provided in a function extension board inserted in the computer or in a function extension unit connected to the computer. Then, a CPU or the like provided in the function extension board or in the function extension unit may perform part or all of actual processing on the basis of an instruction of the program code. A case in which the functions of the embodiments described above are achieved by this processing is included.

(Description of Mobile Phone)

An embodiment of the present invention can be applied to a mobile phone.

A mobile phone according to the present embodiment has functions, such as an electronic mail function, an Internet connection function, and a function of capture and playback of an image, in addition to a voice call function.

The embodiment of the present invention is applicable the capture of an image.

A communication unit of the mobile phone communicates audio data and image data with other phones in a communication scheme in accordance with a communication carrier under contract with a user. During a voice call, an audio processing unit converts audio data from a microphone into a form suitable for the transmission and transmits the data to the communication unit.

Although some preferred embodiments of the present invention have been described, the present invention is not limited thereto, and various modifications and changes within the spirit of the invention are possible.

In the present invention, an in-focus position can be detected accurately in a case, such as with a point light source, in which an evaluation value form used for the contrast AF has a small change in proximity to the in-focus position.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-086625, filed Apr. 17, 2013 which is hereby incorporated by reference herein in its entirety.

What is claimed is:

1. An imaging apparatus, comprising:
an image sensor configured to perform photoelectric conversion on a subject image formed by an image optical system including a focus adjustment unit;
a scan AF operation circuit configured to:

set a first imaging area and a second imaging area;
extract a component of a first frequency band from an image signal output from the first imaging area;
extract a component of a second frequency band from the second imaging area, the second frequency band being higher than the first frequency band; and
calculate a first focus evaluation value based on the component of the first frequency band and calculate a second focus evaluation value based on the component of the second frequency band;
a memory; and
a CPU configured to execute computer executable instruction recorded in the storage device, the computer executable instructions, when executed, cause the imaging apparatus to:
perform control based on the second focus evaluation value of a first focus adjustment process which moves the image optical system to adjust a focus position and perform control based on a third focus evaluation value corresponding to a difference between the first focus evaluation value and the second focus evaluation value of a second focus adjustment process which moves the image optical system to adjust the focus position.

2. The imaging apparatus according to claim 1, wherein: the second imaging area overlaps with the first imaging area.

3. The imaging apparatus according to claim 1, wherein the CPU is further configured to determine whether a subject with luminance equal to or more than a predetermined value is present in at least one of the first imaging area and the second imaging area, and to select the second focus adjustment process in a case where the determination unit has determined that the subject with luminance equal to or more than the predetermined value is present in at least one of the first imaging area and the second imaging area.

4. The imaging apparatus according to claim 3, wherein the CPU unit further configured to determine that the subject with luminance equal to or more than the predetermined value is present in at least one of the first imaging area and the second imaging area in a case where it has been determined that the first focus evaluation value has a relative minimum.

5. The imaging apparatus according to claim 3, wherein the CPU is further configured to determine that the subject with luminance equal to or more than the predetermined value is present in at least one of the first imaging area and the second imaging area in a case where it has been determined that the first focus evaluation value has a relative minimum, and an absolute value of an amount of change in the second focus evaluation value in a region including the relative minimum is smaller than an absolute value of an amount of change in the first focus evaluation value in the region including the relative minimum.

6. The imaging apparatus according to claim 3, wherein the CPU is further configured to select the first focus adjustment process in a case where the determination unit has determined that the subject with luminance equal to or more than the predetermined value is not present in at least one of the first imaging area and the second imaging area.

7. The imaging apparatus according to claim 6, wherein the CPU is further configured to calculate an in-focus position in accordance with a position at which the second focus evaluation value reaches a peak value in a case in which the determination unit has determined that the subject with luminance equal to or more than the predetermined value is not present in at least one of the first imaging area and the second imaging area.

8. The imaging apparatus according to claim 1, wherein a difference between a center frequency of the first frequency band and a center frequency of the second frequency band is equal to or more than 10% with respect to a Nyquist frequency calculated with a pixel pitch of the image sensor.

9. The imaging apparatus according to claim 1, wherein the CPU is further configured to select the first focus adjustment process or the second focus adjustment process.

10. The imaging apparatus according to claim 9, wherein the selection is based on subject luminance.

11. The imaging apparatus according to claim 1, wherein the difference between the first focus evaluation value and the second focus evaluation value is a ratio of the first focus evaluation value and the second focus evaluation value.

12. An imaging method, comprising:
setting a first imaging area and a second imaging area for an image sensor, the second imaging area being narrower than the first imaging area;
extracting a component of a first frequency band of from an image signal output from the first imaging area;
extracting a component of a second frequency band from the image signal output from the second imaging area, the second frequency band being higher than the first frequency band;
calculating a first focus evaluation value based on the component of the first frequency band and a second focus evaluation value based on the component of the second frequency band; and
performing control, based on the second focus evaluation, of a focus adjustment process with which a focus lens is moved for adjustment of a focus position, and,
performing control, based on a third focus evaluation value corresponding to a difference between the first and second focus evaluation values, of a second focus adjustment process with which the focus lens is moved for adjustment of the focus position.

13. The imaging method according to claim 12, wherein the difference between the first focus evaluation value and the second focus evaluation value is a ratio of the first focus evaluation value and the second focus evaluation value.

14. An imaging apparatus, comprising:
an image sensor configured to perform photoelectric conversion on a subject image formed by an image optical system including a focus adjustment unit;
an scan AF operation circuit configured to calculate a first focus evaluation value, a second focus evaluation value, and a third focus evaluation value, the first focus evaluation value being calculated with a component of a first frequency band of an image signal output from a first imaging area of the image sensor, the second focus evaluation value being calculated with a component of a second frequency band of the image signal output from the second imaging area of the image sensor, the second imaging area being narrower than the first imaging area, and the third focus evaluation value being corresponding to a difference between the first and second focus evaluation values;
a memory; and
a CPU configured to execute computer executable instruction recorded in the storage device, the computer executable instructions, when executed, cause the imaging apparatus to:
calculate, in a first mode, a driving signal of the focus adjustment unit using the second focus evaluation value so that the component of the second frequency band calculated from the image signal increases and to calculate, in a second mode, a driving signal of the focus adjustment unit using the third focus evaluation value so that the difference between the first focus evaluation value and the second focus evaluation value increases.

* * * * *